United States Patent [19]

Kilborn

[11] Patent Number: 4,527,052
[45] Date of Patent: Jul. 2, 1985

[54] AUTOTELLER CARD HANDLING MECHANISM

[75] Inventor: Hilary M. H. Kilborn, London, England

[73] Assignee: Burroughs Corporation, Detroit, Mich.

[21] Appl. No.: 576,501

[22] Filed: Feb. 2, 1984

[30] Foreign Application Priority Data

Mar. 29, 1983 [GB] United Kingdom ............... 8308689

[51] Int. Cl.³ .......................................... G06K 13/063
[52] U.S. Cl. ................................. 235/485; 235/475; 235/486; 271/228
[58] Field of Search ............... 235/475, 485, 486; 194/58, 59; 271/228, 238

[56] References Cited

U.S. PATENT DOCUMENTS 3,850,426 11/1974 Blair ............................... 235/485 X
3,939,327 2/1976 Humphrey ..................... 235/485 X

FOREIGN PATENT DOCUMENTS 2097164 10/1982 United Kingdom .

Primary Examiner—David L. Trafton
Attorney, Agent, or Firm—Mark T. Starr; Edmund M. Chung; Kevin R. Peterson

[57] ABSTRACT

In an autoteller, where a card is inserted into a slot to be read by the autoteller, and remains visible at all times by means of an indentation in the slot whereby the card can also be grasped, a cam operated bale arm assembly prevents the card from being removed from the slot by interposing the tips of bale arm behind the fascia of the autoteller between the card and the slot. A bale arm clamp is provided for holding the bale arm assembly closed for the card to be pushed into a retention bin transversely to its direction of insertion into the autoteller by means of a drive wheel driven card ejection pin in the event of the autoteller desiring to retain the card. The bale arm assembly performs a dual action, both preventing the removal of the card and drawing the card into a predetermined position prior to the card being read. The clamp maintains the bale arm assembly in a removal-preventing position even although the cam operating mechanism is de-activated.

24 Claims, 10 Drawing Figures

AUTOTELLER CARD HANDLING MECHANISM

BACKGROUND TO THE INVENTION

1. Field of the Invention

The present invention relates to a card handling mechanism. The invention particularly relates to such a mechanism for use in reading a card presented to an autoteller. More particularly it relates to a card reading and handling mechanism for use in an autoteller where the card remains visible to the user at all times.

2. The Prior Art

It is well known to employ a card reader in an autoteller for reading data from a card presented thereto by a user. Information is read from the card for confirming the validity of the use of the card. Further information is read from the card to confirm that a number or other information entered into the autoteller by the user is correct. If the information so entered is correct, it confirms that the user has a right to employ the card since the information entered by the user is secret to him.

It is general in the art that the user presents his card to the autoteller by means of a slot in its case. The card is then generally taken into the autoteller by a card transport mechanism. The card is then read by such apparatus as a magnetic card reader reading stripes of recorded information on the card. If the card is correct and information read from the card agrees with information entered into the autoteller for example, via a keyboard by the user, then the card is returned by the card transport mechanism through the slot back to the user. If for any reason the autoteller considers that the card is incorrectly used, for example, because the account to which it relates is empty or because the user cannot furnish correct information via the keyboard and therefore might be a fraudulent user, the autoteller swallows the card. The transport mechanism, instead of returning the card to the user, continues to draw the card into the autoteller until the card is deposited into a bin. Cards deposited in the bin are then retained by the bank thereby withdrawing from circulation any illegally used cards. Cards retained by accident or by mistake can be returned to a valid used by the bank as can cards recovered in this manner from illegal users.

Increasing automation in the trend towards more cost-efficient banking operations, has meant an increasing reliance upon autotellers in the transactions of private accound holders with many banks. Some banks now perform all or nearly all such transactions through autotellers. Salaries are paid directly into the bank, cash sums are deposited in accounts, and money for personal use is withdrawn by the private bank account holders all via the autoteller. The autoteller card therefore assumes much more importance to the account holder than it has assumed hitherto. Loss of the autoteller card for any reason has become a more serious matter, resulting in the cutting-off of access by the account holder to banking services. It is therefore of paramount importance that the user should believe that his card is safe and will not be lost to him.

In yet more recent developments, autotellers have been employed to dispense cash on the presentation thereto of a credit card or a charge card. If such a card is lost in the machine for improper reasons the user is not only cut off from a supply of money but also loses access to other credit facilities. In such circumstances it becomes even more important that the user's card should be seen to be safe.

When the card is presented to the autoteller through the slot in its case, there can be created in the user's mind an anxiety that his card will be lost. Accordingly, card reading apparatus has been developed where the card is visible to the user at all times during its being read. As before, the card is presented to the autoteller through a slot. The slot comprises a recess where the card, even although inserted in the autoteller, can be grasped by forefinger and thumb for possible extraction from the autoteller, and where the card remains visible to the user at all times during its being read. Guides within the autoteller position the card for magnetic heads to be passed across recorded magnetic stripes thereon.

Unlike those autotellers employed a card transport mechanism, such card readers where the card remains visible during reading have certain card-positioning and operational problems. The card is inserted by the user to abut against stops within the autoteller. The precision of such positioning is not as precise as the precision of positioning resulting from the use of a card transport mechanism. The magnetic heads which are swept past the magnetic stripes on the card are therefore not so well positioned relatively to those stripes. The chances of data being misread from the card and the card being rejected are therefore higher, increasing the chance that a valid user will lose his card even although he correctly presented it to the autoteller. The card, being visible at all times to the user, and being able to be seized by the user, is therefore able to be forcibly withdrawn from the machine. Thus, if the autoteller desires to retain the card, there is a very good chance that the user can prevent the autoteller from so doing. The user can hang onto the card and get it back for later fraudulent use. This is most serious in circumstances where a forger is developing a card, which is acceptable to the autoteller, by small stages. Earlier machines which swallowed the card whole if it was invalid are very much superior in this regard.

It is therefore desirable to provide an autoteller card reading mechanism where the card, presented by a user, remains visible to the user at all times during his transaction with the autoteller and can be withdrawn from the autoteller by him at the end of the transaction but where the card cannot be withdrawn by the user should the autoteller wish to retain it for any reason. It is desirable that such a mechanism comprises means for depositing cards to be retained in a secure place away from access by the user. It is yet further desirable that means be provided in such a reader, in co-operation with these aforementioned features, for positioning the card with precision prior to its being read by a magnetic stripe card reader.

SUMMARY OF THE INVENTION

According to a first aspect, the present invention consists in a card handling mechanism wherein a card is presented through an indented slot in a fascia to a card reading mechanism, said card handling mechanism being characterised by comprising first and second bale arms, insertable behind said fascia between the edge of said card and said slot on either side of the indentation in said slot to prevent said card being withdrawn from said slot and further characterised by said bale arms being operable to draw said card into a predetermined position prior to said card reading mechanism reading said card.

According to a second aspect, the present invention consists in a card handling mechanism according to the first aspect further characterised by comprising a mechanism for driving said card transversely to its direction of insertion into said slot behind said bale arm for deposition into a card retaining bin behind said fascia in the event of it being desired to retain said card.

BRIEF DESCRIPTION OF THE PREFERRED EMBODIMENT

In a preferred embodiment, a card handling mechanism preferably has a card inserted through a slot in a fascia of an autoteller for subsequent reading by a magnetic card reader. The slot preferably comprises an indentation in the centre thereof. The indentation preferably allows access to the card by the user whilst the card is being read. The indentation preferably allows the insertion of the card by finger and thumb into the slot. The indentation preferably also allows the withdrawal of the card from the slot in a similar manner. The card preferably remains visible to the user in the indentation during the time of transaction with the autoteller. The card handling mechanism preferably comprises first and second bale arms. The first and second bale arms are preferably insertable on first and second sides of the indentation respectively between the card and the fascia to prevent the withdrawal of the card through the slot.

The first and second bale arms are preferably part of a common bale arm assembly. The common bale arm assembly is preferably controlled in its movements by a rotary cam. The cam is preferably operable to move the bale arm assembly both in a rotary and a to and fro manner, the bale arm assembly being mounted on a pair of sliding pivots. The cam mechanism is preferably operated by a single stroke bale arm solenoid selectively operable by the autoteller. A bale arm clamp is preferably operable to hold the bale arm assembly in a depressed position to retain the card in the mechanism. A clamp solenoid preferably operates the bale arm clamp in response to energisation from the autoteller.

A card ejection pin is preferably driven by a pin driving wheel towards and away from the card. The pin driving wheel is preferably turned by an electric motor in response to current supplied by the autoteller. The electric motor is preferably controlled by a combination of a switch, activated when the arm ejection pin is at either extreme of its travel, and a relay, to move the pin to eject the card from under the bale arms into a retention bin whenever the autoteller requires that the card should be retained.

The cam mechanism is preferably operable to cause the bale arm assembly to perform a dual movement. The dual movement preferably consists in a first movement where the bale arms descend for their tips to lie behind the fascia between the card and the slot to prevent the withdrawal of the card by the user via the indentation. The second part of the movement preferably consists in the bale arm, already being in the downward position to retain the card, being withdrawn from the fascia to pull the card again. To accurately position the card prior to being read by a moving head magnetic card reader.

In operation the card is preferably inserted through the slot to lie upon a bed. A micro switch is preferably operable by the first-inserted edge of the card to provide indication to the autoteller when the card has been inserted by a predetermined amount. Upon receipt of the indication from the micro switch, the autoteller preferably energises the bale arm solenoid. The bale arm solenoid preferably pulls on a bale arm linkage which rotates the bale arm cam mechanism. The bale arm cam mechanism preferably comprises a bale arm cam bearing down at a first point on the bale arm and at a second point on a projection having a surface at 90° to the bale arm.

With the bale arm solenoid unenergised the bale arm assembly is preferably in a raised position allowing the insertion of the card into and the withdrawal of the card from the autoteller. The cam preferably comprises areas of first second and third radii, the third radius being greater than the second radius and the second radius being greater than the first radius. When the bale arm solenoid is not energised the portion of the cam with the first radius preferably contacts the projection at the second point and the portion of the cam with the second radius preferably contacts the bale arm assembly at the first point. As the bale arm solenoid is activated, the cam preferably passes through an intermediate position where the portion of the cam with the first radius contacts the projection at the second point and the portion of the cam with the third radius contacts the bale arm assembly at the first point. In this position the bale arm is preferably lowered so that its tips are interposed between the card and the slot in the fascia so that the card cannot be withdrawn through the slot. As the bale arm solenoid completes its action, the cam preferably rotates to a final position where the portion of the cam with the second radius contacts the projection at the second point and the portion of the cam with the third radius contacts the bale arm at the first point, thereby moving back the bale arm so that the bale arm fingers pull back the card into exact registration against the micro switch so that the magnetic card reader may gain accurate access to the magnetic strips on the card. The bale arm assembly preferably slides and rotates in the sliding pivot.

The pin driving wheel, rotated by the electric motor, preferably comprises an elastically coated face with a semi-circular cross sectioned channel set therein for accommodating the card ejection pin. The mechanism also preferably comprises an idler wheel pushing against the pin driving wheel and also having a semi-circular channel therein for accommodating the card ejection pin. The pin driving wheel and the pin idler wheel preferably co-operate to grip the pin and to move it by means of reversable action of the electric motor towards and away from the card. The card ejection pin preferably is constrained to move in a substantially semi-circular cross section groove in the bed whereon the card lies for the tip of the card ejection pin to engage the side of the card for the card to be pushed across the bed towards the card retention bin.

In operation the presence of a card, newly inserted into the slot, and detected by the micro switch, causes first of all the bale arm solenoid to be activated. This has the action preferably of bringing the tips of the bale arms down behind the card to prevent the card being withdrawn through the slot and of bringing the card forward to be in exact registration with the position it should occupy for the card reader to read the card. If the transaction is successful and there is no desire on the part of the autoteller to retain the card, the bale arm solenoid is preferably de-energised thereby allowing the user of the autoteller to remove the card once again. If the transaction is not satisfactory and the autoteller desires to retain the card the autoteller preferably activates the clamp solenoid which operates through a linkage to bring the bale arm clamp into engagement with the bale arm assembly. Thereafter the bale arm solenoid is preferably de-energised. This has the effect of returning the cam to the first position. The bale arm assembly preferably no longer pulls the card into the correct card reading position but leaves the card free to slide transversely to its direction on insertion into the slot. The bale arm clamp preferably maintains the bale arm assembly in the depressed position so that the bale arm prevents the removal of the card through the slot by the user. The autoteller preferably energises the electric motor to drive the card ejection pin in a single cycle pushing the card sideways beneath the bale arms across the bed into the card retention bin. The bale arm clamp solenoid preferably exerts enough force on the bale arm clamp to prevent the user being able to withdraw the card with his fingers from the indentation by brute force, lifting the bale arm.

The card ejection pin preferably comprises first and second flags for engaging the switch assembly at either end respectively of its range of travel. When the motor is energised, the card ejection pin preferably travels forward towards the card to eject the card into the card retention bin, the forward motion being changed to a reverse motion by the first flag contacting the switch and the subsequent reverse motion being terminated by the second flag contacting the switch. The reverse motion preferably takes the card ejection pin clear of that part of the bed occupied by the card when the card is being read, so that a new card may be inserted by another user.

BRIEF DESCRIPTION OF THE DRAWINGS

The invention is further explained, by way of an example, by the following description taken in conjunction with the appended drawings, in which.

DETAILED DESCRIPTION OF THE PREFERRED EMBODIMENT

Figure 1:
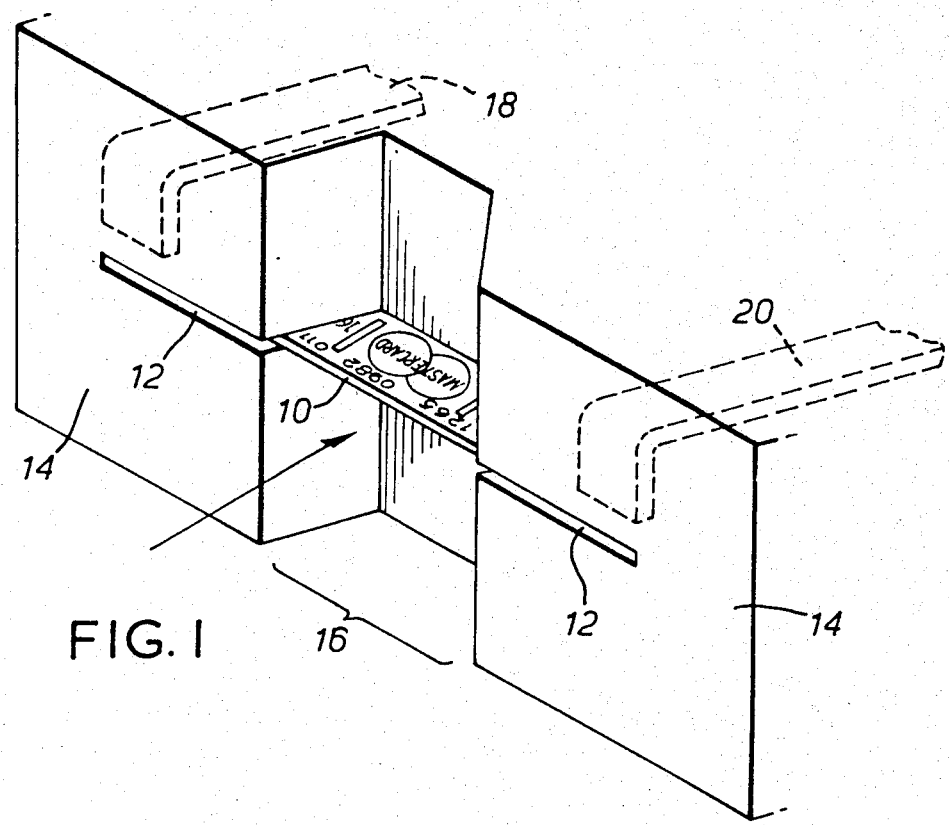
FIG. 1 shows a portion of the fascia of an autoteller bearing the indented slot wherein a card is inserted.

FIG. 1 shows a portion of the face of an autoteller bearing a slot for the insertion of the card.

A card number 10 is inserted through a slot 12 in the fascia 14 of an autoteller. The slot comprises an indentation 16 whereby the card 10 can be reached by the user of the autoteller using forefinger and thumb. The card 10 is also visible in the indentation 16 whenever the card 10 is in the autoteller. A first bale arm 18, shown here in phantom outline, is located to a first side of the indentation 16 in the slot 12 between the card 10 and the slot 12. A second bale arm 20 is located to a second side of the indentation 16 between the card 10 and the slot 12. The tips of the bale arms 18, 20 are bent at 90° thereto and can be inserted between the edge of the card 10 and the slot 12 behind the fascia 14 to prevent the removal of the card 10 by the user inserting his forefinger and thumb into the indentation 16. When so inserted, the tips of the bale arms, 18, 20, remain invisible to the user. The user, being unaware of the insertion of the bale arms 18, 20 to prevent the removal of his card 10, enjoys a psychological security in that his card 10 is visible to him at all times and at least appears able to be retrieved by him if he so desires.

Figure 2:
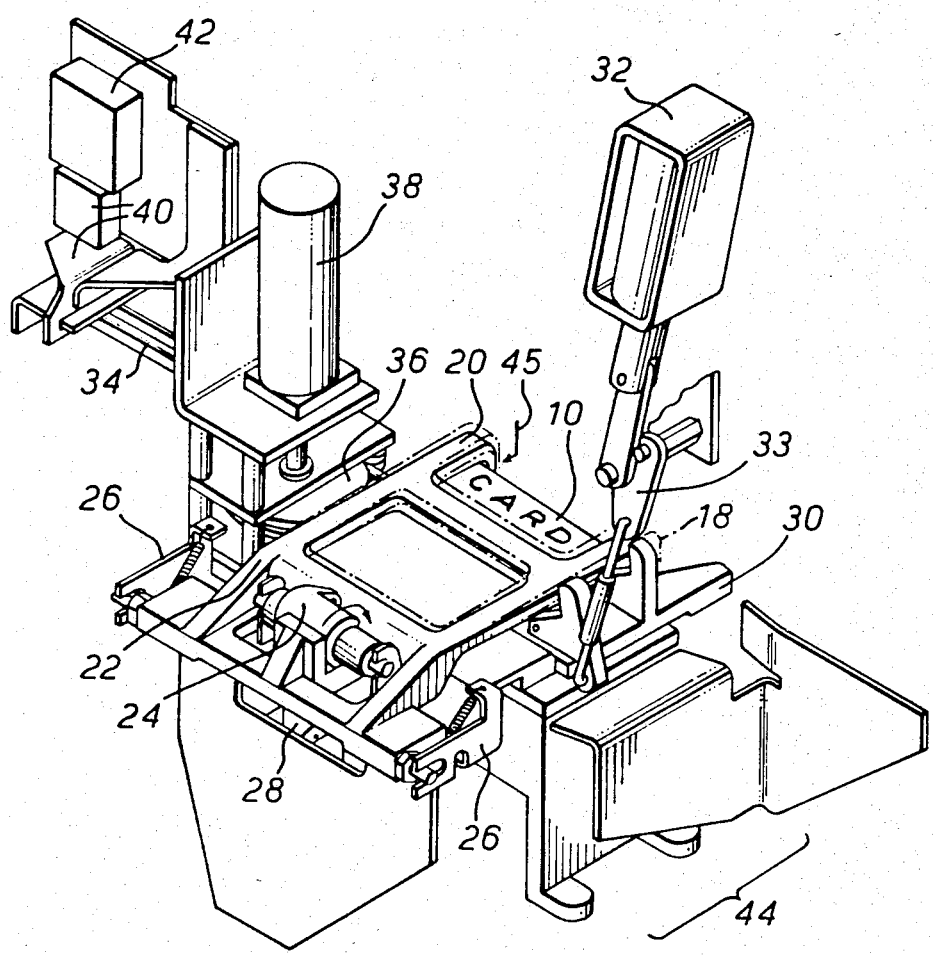
FIG. 2 shows an isometric view from the rear of the fascia of FIG. 1 showing the component parts of the card handling mechanism, and generally indicative of the conditions prevailing upon first insertion of a card into the autoteller.

FIG. 2 shows the equipment of the card transport mechanism viewed from behind the fascia 14, and particularly shows the situation when a card 14 has been inserted into the autoteller.

The first and second bale arms 20, 18 are part of a common bale arm assembly 22 activated by a cam mechanism 24 to rotate about sliding pivots 26 at either side thereof when energised by a bale arm solenoid 28 for the plane of the common bale arm assembly 22 to move into and out of parallelism with the plane of the card 10 and for the common bale arm assembly 22 to be drawn to the left as seen in FIG. 2 to draw the card 10 into the position it should occupy before it is read. In addition to the common bale arm assembly 22 there is provided a bale arm clamp 30 movable in response to the energisation of a clamp solenoid 32 operating through a linkage 33 to engage the common bale arm assembly 22 to hold the common bale arm assembly 22 parallel to the card 10.

A card ejection pin 34 is moveable by a pin driving wheel 36, turned by an electric motor 38, towards and away from the card 10. The direction and extent of the travel of the card ejection pin 34 is controlled by projections of the pin 34 engaging a switch assembly 40 used in conjunction with a relay 42, in a manner well known in the art. When the pin 34 is at the extremity of its travel towards the card 10 the card 10 is ejected into a card retaining bin 44. When the pin 34 is at the extremity of its travel away from the card 10 the pin 34 does not interfere with the insertion of a card 10 into the autoteller or the removal of a card 10 from the autoteller.

When the card 10 is inserted into the autoteller the bale arm solenoid 28 is activated to cause the cam mechanism 24 to move the tips of the bale arms 18, 20 in the direction indicated by a first arrow 45 from a first position, here shown in phantom outline, where the card 10 is free to be inserted into or removed from the autoteller without engaging the tips of the bale arms 18, 20, to a second position, here shown in solid line, where the bale arms 18, 20 have gripped the card 10 to prevent its removal from the autoteller and have pulled the card 10 back into the autoteller for the card 10 to be read.

Figure 3:
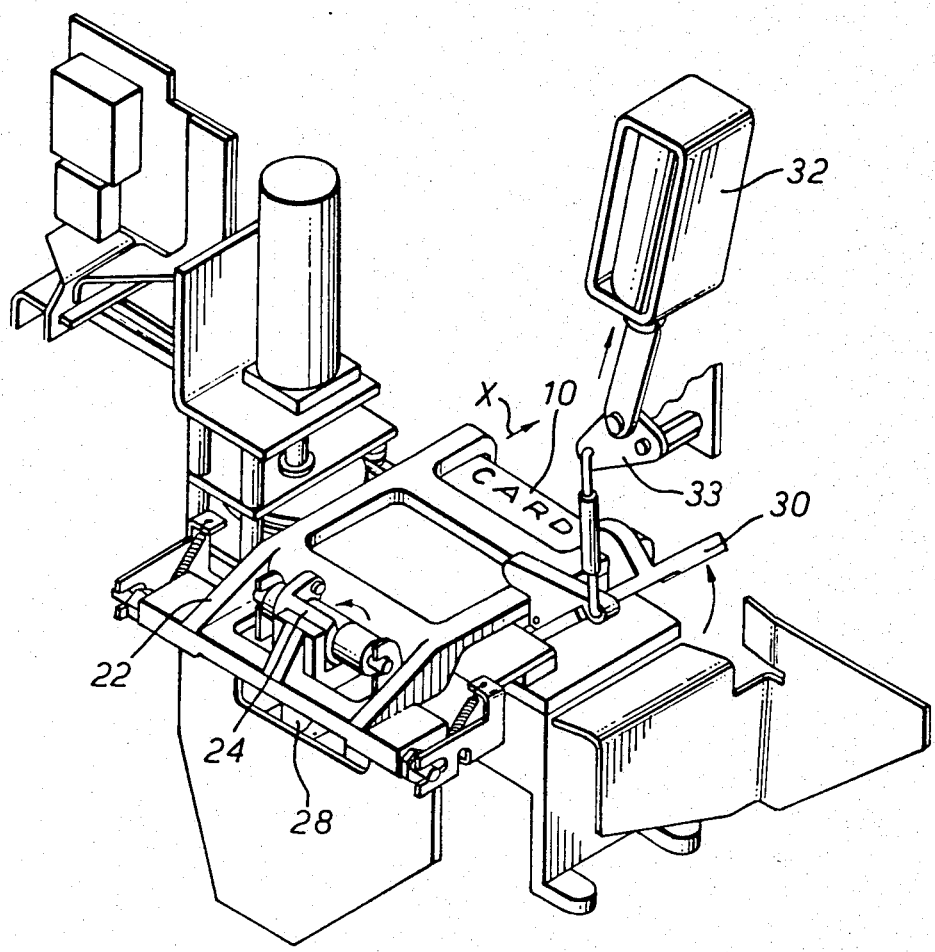
FIG. 3 shows the apparatus of FIG. 2 at the point where the autoteller has taken the decision to retain a card.

FIG. 3 shows the apparatus of FIG. 2 when the autoteller has decided that the card 10 should be retained.

With the card 10 held by the bale arm assembly 22, as indicated in FIG. 1, a card reader, of any type known in the art, is passed beneath the card 10 to read information recorded on magnetic stripes thereon. It is not important to the present invention exactly what the nature of that card reader may be. It is sufficient that it is able to read the card 10 and it is presented to the machine as described. The card reader can access the card 10 through the top of the common bale arm assembly 22 or from beneath the card 10. It is expected with the present embodiment that the reader will comprise one or more magnetic heads swept along the path of the magnetically recorded stripes on the card 10 by a motor mechanism. Those skilled in the art will be aware that other mechanisms can be used for reading the card. They will further be aware that mechanisms other than magnetic can be so used. In particular, optical bar code and character recognising devices can also be used with the present invention.

If the autoteller, having read information from the card 10, is not satisfied that the card 10 is a valid card or is not satisfied that the information presented by the card user via a keyboard is sufficiently accurate to identify the users as the true and valid user of the card 10, the autoteller activates the mechanism as indicated in FIG. 3. The autoteller energises the clamp solenoid 32 to act upon the bale arm clamp 30 via the linkage 33 to hold the common bale arm assembly 22 parallel with the card 10 for the tips of the bale arm assembly 22, 20, 18, to retain the card 10 in the mechanism. The autoteller then de-energises the bale arm solenoid 28 which has the effect of releasing the cam mechanism 24. This would normally have the effect of allowing the common bale arm assembly 22 to return to the first position shown in phantom outline in FIG. 2. However, the bale arm clamp 30 prevents such a return and keeps the bale arms 18, 22 on the card 10. With the de-activation of the cam mechanism 24, the tips of the bale arms, 18, 20, are no longer forced against the card 10 to draw the card 10 into the mechanism, and the bale arm assembly 22 returns towards the fascia 14 as indicated by the arrow X whilst still preventing the card 10 from being removed from the autoteller.

Figure 4:
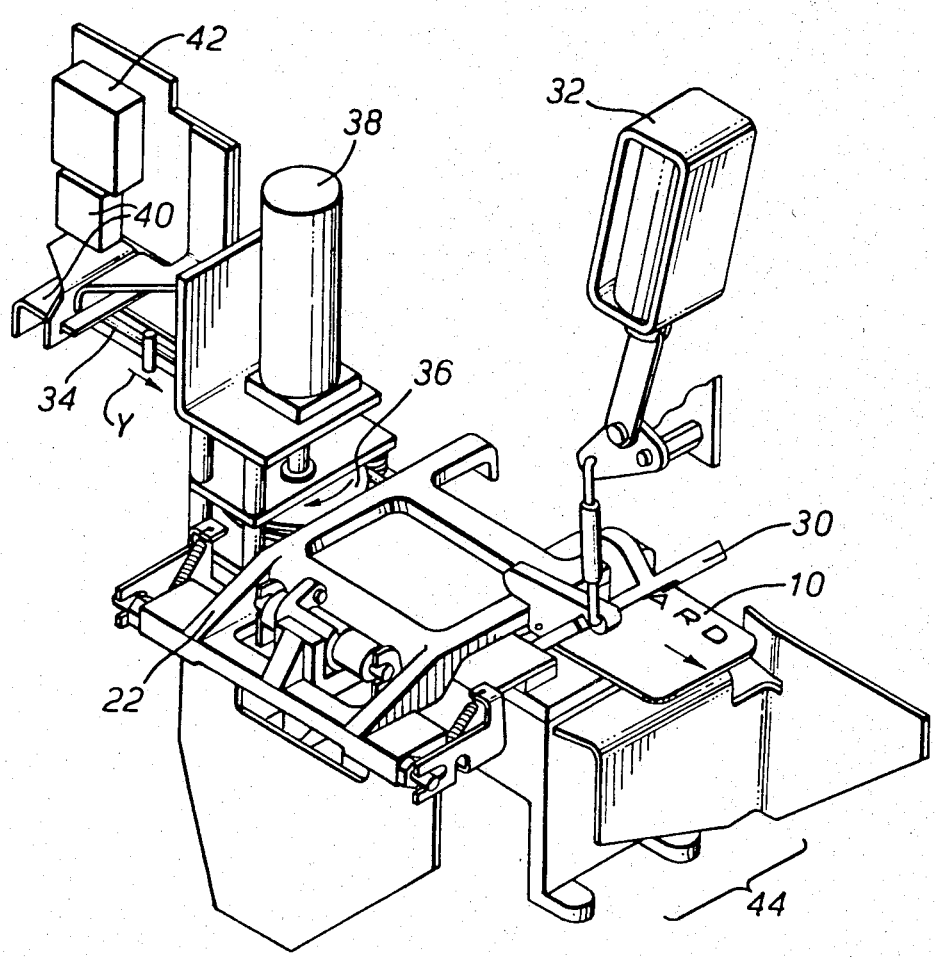
FIG. 4 shows the apparatus of FIG. 2 when the autoteller is in the middle of ejecting a card into the card retaining bin.

It is to be appreciated that the bale arm clamp 30 does not push the bale arm assembly 22 so hard against the card 10 that the card cannot slip from thereunder. Stops beneath the common bale arm assembly 22 prevent the bale arm assembly 22 locking the card 10 in place. They only prevent the removal of the card 10 from the mechanism. With the allowing of the movement of the common bale arm assembly 22 as indicated by the arrow X the card 10 is free to slide beneath the common bale arm assembly 22. FIG. 4 shows the situation ensuing immediately after that depicted in FIG. 3 where the autoteller is in the middle of retaining a card 10.

The autoteller energises the electric motor 38 to drive the card ejection pin 34 as indicated by the arrow Y towards the card 10 to push the card 10 from beneath the common bale arm assembly 22 towards the card retention bin 44. The movement of the card ejection pin 34 towards the card 10 is automatically provided for by the combination of the switch 40 and the relay 42. The clamp solenoid 32 remains energised. The user therefore cannot withdraw the card 10 by brute force. The bale arm clamp 30 is so pivoted and positioned that the card 10 passes there beneath as the pin driving wheel 36 pushes the card ejection pin in engagement with the card 10.

Figure 5:
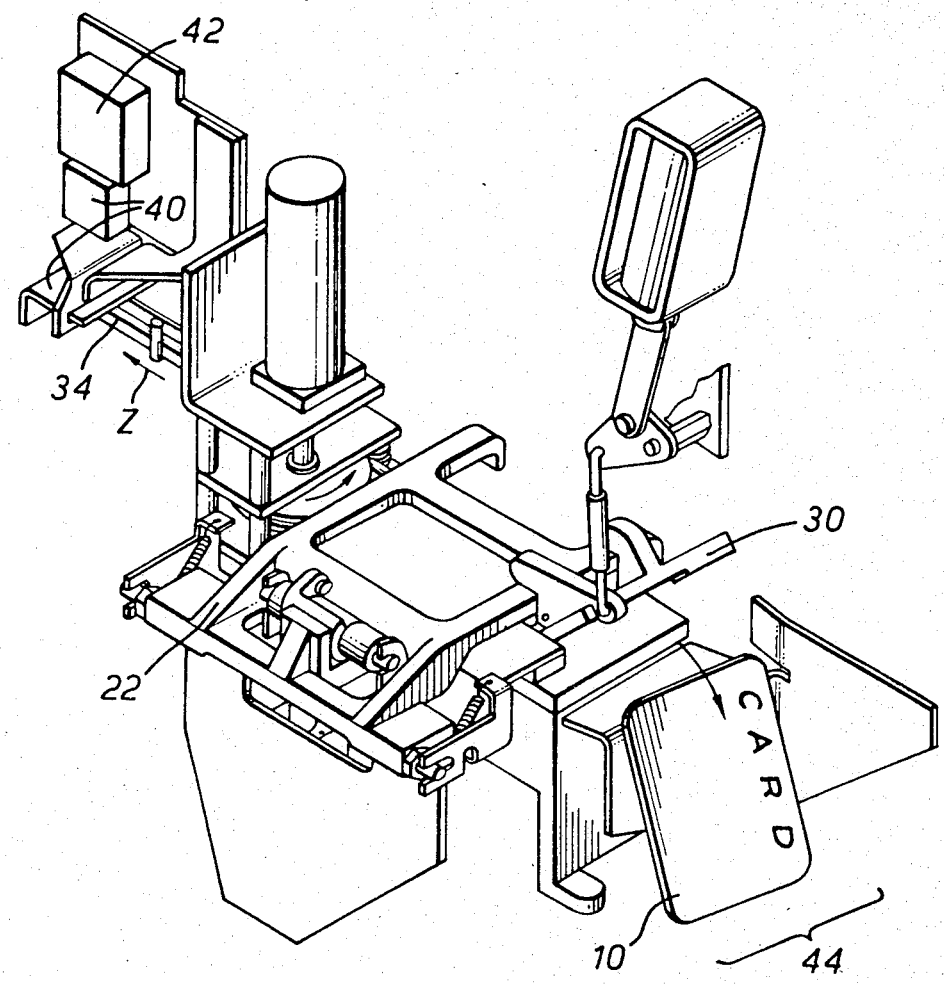
FIG. 5 shows the apparatus of FIG. 2 at the termination of the ejection of a card into the card retaining bin.

FIG. 5 shows the situation immediately after that of FIG. 4 where the card 10 has been ejected into the card retention bin 44.

The card ejection pin 34, having travelled to an extremity in the direction of the card 10 has pushed the card 10 from its card reading position into the bin 44. Having reached this extremity, the card ejection pin 34, having activated the switch 40 with a projection, is automatically returned in the direction of the arrow Z back to its starting position where a further projection with once again activate the switch 40 to stop the card ejection pin 34 altogether in readiness for a further one-shock excursion towards and away from the card 10 should it so be commanded to do at a later time.

Figure 6:
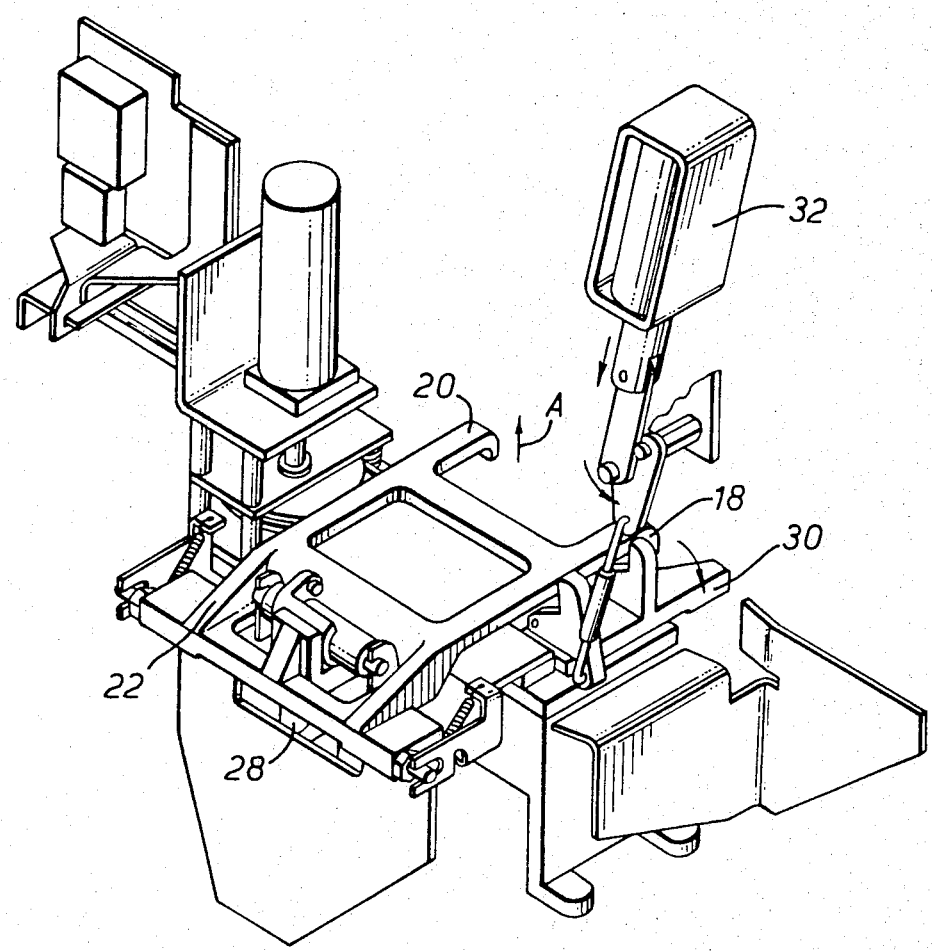
FIG. 6 shows the apparatus of FIG. 2 subsequent to the actions of FIG. 5 returning to a position ready to receive a new card.

FIG. 6 shows the situation immediately after that of FIG. 5, or immdiately after that of FIG. 2.

With the card 10 either having been successfully read and accepted as valid and having been deemed acceptable for return to the user or with the card 10 having been found unacceptable and ejected into the card retention bin 44, the autoteller returns the mechanism to a condition of readiness for accepting a further card 10.

In the event of FIG. 6 being representative of the next stage from FIG. 2, the autoteller de-energises the bale arm solenoid 28, returning the common bale arm assembly 22 as indicated by the arrow A to the first position indicated in phantom in FIG. 2 thereby allowing the insertion of a new card 10 beneath the now raised common bale arm assembly 22.

In the event of FIG. 6 being the next stage of operation subsequent to that of FIG. 5, the autoteller de-energises the clamp solenoid 32 for the bale arm clamp 30 to disengage the common bale arm assembly 22 for the common bale arm assmebly 22 to rise as indicated by the arrow A. This allows the insertion of a new card 10 beneath the common bale arm assembly 22 without the card 10 engaging the tips of the bale arms 18, 20.

It is to be appreciated in both the above instances that the common bale arm assembly 22 is returned to its raised position where a card 10 can be inserted by means of springs. It is also to be appreciated that whereas in the description of the preferred embodiment the bale arm clamp 30 has been described as engaging the common bale arm assembly 22 only in the event of its being desired by the autoteller to retain the card 10, the clamp solenoid 32 can be energised by the autoteller during a normal card reading as indicated in FIG. 2, in which instance the bale arm solenoid 28 would continue to be energised and the bale arm clamp 30 would lend added security to the holding of the card in the autoteller. Again it is to be appreciated that it is possible to read the card 10 with the bale arm clamp 30 in engagement with the common bale arm assembly 22 but with the bale arm solenoid 28 de-energised.

Figure 7A:
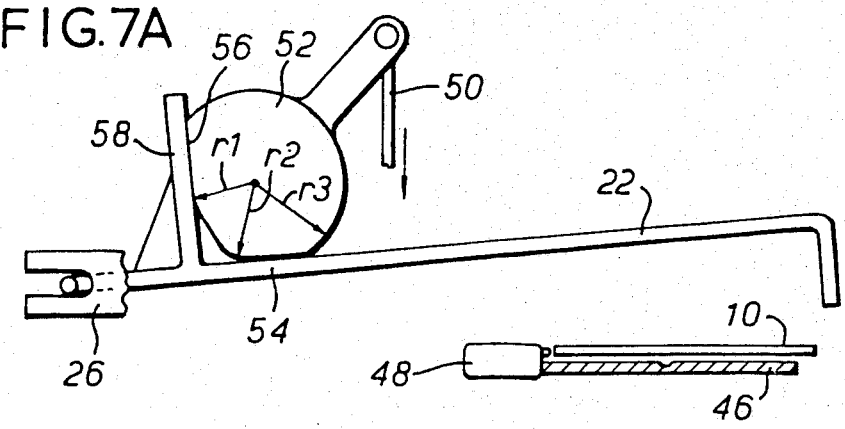
FIGS. 7a, 7b and 7c show schematic detail of the action of the cam assembly upon the bale arm assembly.

FIG. 7A shows schematic detail of the cam assembly 24 operating the common bale arm assembly 22 immediately after the insertion of a card 10.

When the card 10 is inserted into the autoteller it lies upon a bed 46. With continued insertion the card engages a micro switch 48 which detects that the card is within 0.05 cm of the position it should occupy prior to reading. When the micro switch 48 is activated it informs the autoteller that a card 10 is present and requires to be read. The autoteller then activates the bale arm solenoid 28 which operates through a bale arm solenoid linkage 50 to turn the cam 52.

The cam 52, being part of the cam assembly 24, comprises a portion of a first radius r1, a portion of a second radius r2, and a portion of a third radius r3. The cam 52 contacts the common bale arm assembly 22 at a first point 54 and has contact at a second point 56 with a projection 58 having a surface at 90° to the plane of the common bale arm assembly 22. The first radius r1 is smaller than the second radius r2 which in turn is smaller than the third radius r3. With the bale arm solenoid 28 de-energised, the cam 52 lies in a first position with a portion of the first radius r1 in contact with the projection 58 at the second point 56 and with a portion of the second radius r2 in contact with the bale arm assembly 22 at the first point 54. In this position, the bale arms 18, 22 are raised such that their tips are clear of the path of entry of the card 10 into the autoteller and onto the bed 46. The card 10 can be placed into and withdrawn from the autoteller when the bale arm assembly 22 is in this position.

Figure 7B:
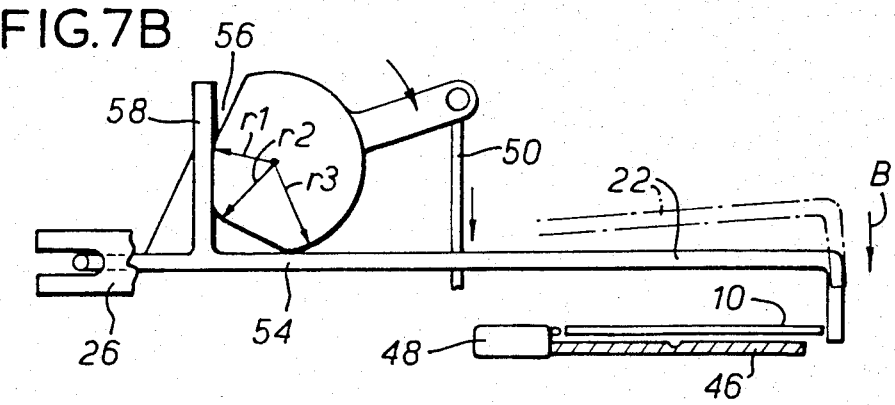

FIG. 7B shows the cam assembly 24 in an intermediate position during the activation of the bale arm solenoid 28.

As the bale arm solenoid 28 pulls the bale arm linkage 50, the cam 52 passes through an intermediate position where a portion thereof of the first radius r1 remains in contact with the projection 58 at the second point 56 but a new portion of radius r3 comes into contact with the bale arm assembly 22 in place of the portion previously in contact therewith having the second radius r3. Since the third radius r3 is greater than the second radius r2, the common bale arm assembly 22 moves from the first position, shown in phantom outline, being the occupied in FIG. 7A, to a second position where the plane of the common bale arm assembly, shown in solid line, is parallel to the plane of the card 10 as indicated by the arrow B. Since the second point 56 has remained all this while in contact with a portion of the cam 52 of the first radius r1, the common bale arm assembly 22 has not moved at all in a direction parallel to the direction of insertion of the card 10.

Figure 7C:
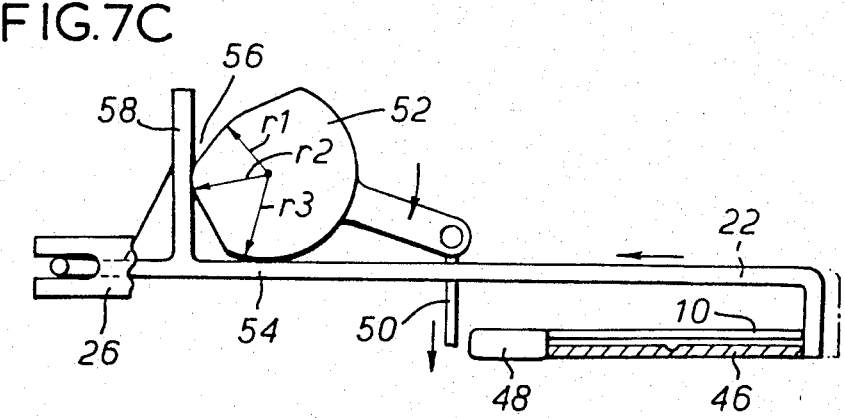

FIG. 7C shows the mutual interaction of the cam assembly 24 and the common bale arm assembly 22 at the point where the bale arm solenoid 28 is completely energised.

When the bale arm solenoid 28 has pulled the bale arm linkage 50 to its final position, the cam 52 rests with a portion of the second radius r2 in contact with the projection 58 at the first point 56 and with a portion of the third radius r3 in contact with the bale arm assembly 22 at the first point 54. Since the first point 54 is in contact with and has remained in contact with a portion of the third radius r3, the bale arm assembly 22 stays in the plane of the card 10. The second point 56 of the projection 58 has ceased to be in contact with a point with the first radius r1 and has come into contact with a point of the second radius r2. Since the second radius r2 is greater than the first radius r1, the projection 58, and therefore the entire bale arm assembly 22, is forced backwards away from the slot 12 by a distance equal to the difference between the second radius r2 and the first radius r1. This has the effect of causing the tips of the bale arms, 18, 20 to engage the edge of the card 10 and, in the movement of the common bale arm assembly 22 away from the slot 12, to move the card 10 hard against the micro switch 48 bringing the card 10 into position for the card reader to read the card 10. In the backward movement of the common bale arm assembly 22 the pivot point thereof slides backwards in the sliding pivot 26.

When the bale arm solenoid 28 is de-energised, the cam 52 returns to the position indicated in FIG. 7A allowing the withdrawal of the card 10 from the autoteller.

Figure 8:
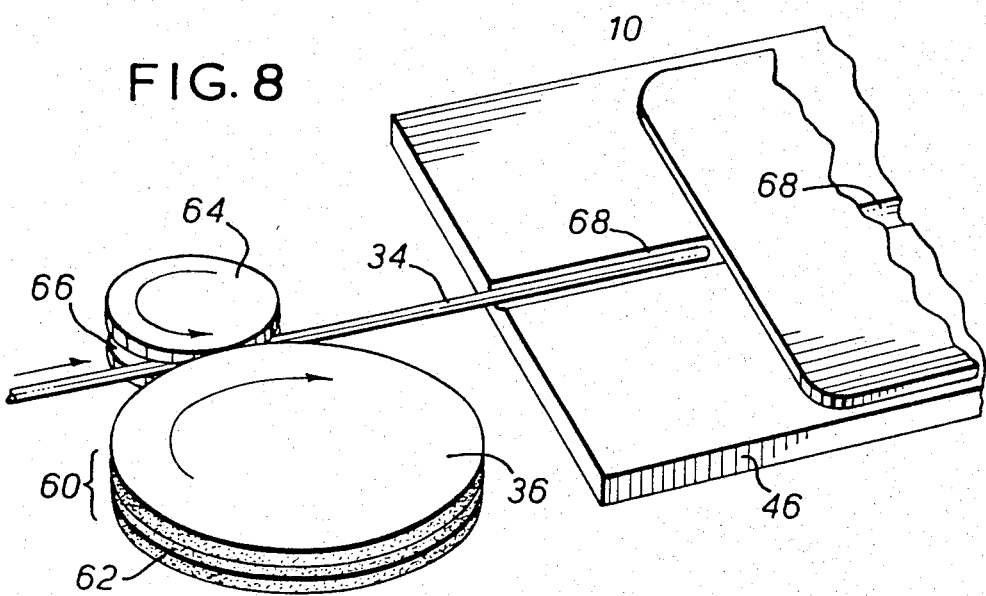
FIG. 8 shows, in simplified form, the manner of driving the card ejection pin to push the card.

FIG. 8 shows a simplified isometric view of the apparatus for driving the card ejection pin 34.

The pin driving wheel 36 is provided with an elastically coated face 60 having a semi-circular cross section channel 62 set therein. The elastically coated face 60 is provided on a steel core. The elastic material is preferably elastomeric polyurethane which was found to have the correct amount of friction against the card ejection pin 34. A pin idler wheel 64, made from steel, pushes hard against the pin driving wheel 36 and has a second semi-circular cross section groove 66 therein for holding the card ejection pin in the first semi-circular cross section groove 62 in a mangle action. The pin driving wheel 36 is rotated by the electric motor 38 as previously described. The bed 46 whereon the card 10 is deposited when inserted through the slot 12 comprises a substantially semi-circular groove 68 set in the top thereof. The combination of the pin driving wheel 36 and of the pin idler wheel 64 causes the card ejection pin 34 to slide in the groove 68. The tip of the card ejection pin 34 projects a little way out of the groove 68 and, when the pin 34 is moved towards the card 10, the tip of the card ejection pin 34, projecting out of the groove 68, engages the edge of the card 10 and forces it across the bed 46.

Whilst it has been shown in FIG. 8 that the bed 46 is continuous and solid, it is to be appreciated that the bed 46 can be provided with apertures and grooves where through magnetic heads can gain access to the rear of the card 10 for reading magnetic stripes recorded thereon. Those skilled in the art will be aware of simple modifications required to the apparatus and to bed 46 described for this to be possible.

While the present invention has been described in relation to the use of the card reader in an autoteller, those skilled in the art will be aware of many other applications for such a card reader. In particular, such a card reader can be used in security equipment where personnel are issued with identifying cards which allow them access to sensitive and secure installations. Such a reader can also be used for the automatic sale of goods and services, for example, in an automatic petrol pump. Those skilled in the art will be aware of many more such applications for a card reader.

What I claim is:

1. A card handling mechanism comprising:
   an indented slot in a fascia for the presentation therethrough of a card to a card reader, said indented slot having an indented portion whereby the card remains visible in said indented portion during said presentation to said card reader;
   first and second bale arms having respective first and second angled tips at the respective distal ends thereof; and
   actuator means operable to urge said bale arms towards an inserted card for the insertion of said first and second tips respectively on either side of said indented portion behind said fascia, between said slot and the inserted card whereby the withdrawal of the inserted card from said slot is prevented; and
   control means coupled to acutate said actuator means upon insertion of a card into said slot, where
   said actuator means are subsequently operable to urge said bale arms back from said slot behind said fascia for said tips to engage the inserted card and urge the inserted card against a stop for the inserted card to be positioned in a predetermined position prior to said card reader reading the inserted card.

2. A card handling mechanism according to claim 1, comprising:
a card retention mechanism comprising:
a card driving mechanism for driving an inserted card transversely to its direction of insertion into said slot, parallel to said slot, behind said tips of said bale arms;
a card retaining bin behind said fascia for receiving the retained, inserted card from said card driving mechanism, where
said control means is operable to activate said card driving mechanism in the event of said control means being in receipt of an externally indicated requirement for the retention of the card.

3. A card handling mechanism according to claim 2, wherein said card retention mechanism further comprises:
a bale arm clamp, operable to engage said bale arms prior to said card driving mechanism driving an inserted card to be retained to maintain said bale arms with said tips intermediate between the inserted card to be retained and said slot permissively of the movement of the card relative thereto, where
said control means is operable to release said actuator means subsequently to the operation of said bale arm clamp but prior to the operation of said card driving mechanism.

4. A card handling mechanism according to claim 1, wherein said control means comprises:
a sensor for detecting the insertion of a card into said slot and for providing an output indicative thereof, where
said output of said sensor is coupled to said actuator means, said actuator means being operable in response to the receipt of said indication from said sensor.

5. A card handling mechanism according to claim 4, wherein said actuator means comprises:
a bale arm cam mechanism, said cam mechanism comprising:
a cam;
a projection on said bale arms having a surface at a right angle to said bale arms; and
an actuator, where
said actuator is operable, when released, to position said cam in a first angular position for withdrawing said tips from behind said fascia for allowing the insertion of a card into said slot or the withdrawal of a card from said slot, where
said actuator is operable to rotate said cam from said first angular position to a second angular position for said cam to engage said bale arms to urge said tips of said bale arms between an inserted card and said slot to prevent the withdrawal of the inserted card from said slot, and where
said actuator is thereafter operable to rotate said cam from said second angular position to a third angular position for said cam to engage said projection to urge said tips of said bale arms away from said slot behind said fascia to engage the inserted card to urge the inserted card against said stop.

6. A card handling mechanism according to claim 5, wherein said actuator comprises:
a bale arm linkage coupled to impart rotational motion to said cam; and a bale arm solenoid, coupled to said linkage and energisable to pull upon said linkage to impart rotation to said cam.

7. A card handling mechanism according to claim 2, wherein said card driving mechanism comprises:
a bed for receiving an inserted card whereon the inserted card rests and whereagainst the inserted card is urged by said bale arms;
a channel in said bed transverse to said direction of insertion of a card; and
a card driving pin, moveable along said channel and comprising a projecting portion projecting from said channel, where
said card driving pin is moveable along said channel for said projecting portion to engage an edge of an inserted card which is to be retained to urge the inserted card from said bed into said retaining bin.

8. A card driving mechanism according to claim 7, wherein said card driving mechanism comprises:
a pin driving wheel having a circumferential channel for engaging and holding said card driving pin; and
a pin idler wheel comprising a circumferential channel for engaging said card driving pin, where
said pin idler wheel is co-operatively urged against said pin driving wheel for the retention of said card driving pin therebetween, and where
said pin driving wheel is rotatable to urge said card driving pin along said channel in said bed.

9. A card handling mechanism according to claim 8, wherein said card driving mechanism comprises:
a motor for rotating said pin driving wheel, and wherein said control means comprises:
a switch assembly, coupled to said card driving pin and operable to provide indication when said card driving pin has reached an extremity of movement along said channel in said bed, where
said switch assembly is coupled to said motor to reverse the direction of rotation of said motor to return said card driving pin to a start position.

10. A card handling mechanism according to claim 2, wherein said control means comprises:
a sensor for detecting the insertion of a card into said slot and for providing an output indicative thereof, where
said output of said sensor is coupled to said actuator means, said actuator means being operable in response to the receipt of said indication from said sensor.

11. A card handling mechanism according to claim 10, wherein said actuator means comprises:
a bale arm cam mechanism, said cam mechanism comprising:
a cam;
a projection on said bale arms having a surface at a right angle to said bale arms; and
an actuator, where
said actuator is operable, when released, to position said cam in a first angular position for withdrawing said tips from behind said fascia for allowing the insertion of a card into said slot or the withdrawal of a card from said slot, where
said actuator is operable to rotate said cam from said first angular position to a second angular position for said cam to engage said bale arms to urge said tips of said bale arms between an inserted card and said slot to prevent the withdrawal of the inserted card from said slot, and where said actuator is thereafter operable to rotate said cam from said second angular position to a third angular position for said cam to engage said projection to urge said tips of said bale arms away from said slot behind said fascia to engage the inserted card to urge the inserted card against said stop.

12. A card handling mechanism according to claim 11, wherein said actuator comprises:
 a bale arm linkage coupled to impart rotational motion to said cam; and
 a bale arm solenoid, coupled to said linkage and energisable to pull upon said linkage to impart rotation to said cam.

13. A card handling mechanism according to claim 3, wherein said card driving mechanism comprises:
 a bed for receiving an inserted card whereon the inserted card rests and whereagainst the inserted card is urged by said bale arms;
 a channel in said bed transverse to said direction of insertion of a card; and
 a card driving pin, moveable along said channel and comprising a projecting portion projecting from said channel, where
 said card driving pin is moveable along said channel for said projecting portion to engage an edge of an inserted card which is to be retained to urge the inserted card from said bed into said retaining bin.

14. A card driving mechanism according to claim 13, wherein said card driving mechanism comprises:
 a pin driving wheel having a circumferential channel for engaging and holding said card driving pin; and
 a pin idler wheel comprising a circumferential channel for engaging said card driving pin, where
 said pin idler wheel is co-operatively urged against said pin driving wheel for the retention of said card driving pin therebetween, and where
 said pin driving wheel is rotatable to urge said card driving pin along said channel in said bed.

15. A card handling mechanism according to claim 14, wherein said card driving mechanism comprises:
 a motor for rotating said pin driving wheel, and wherein said control means comprises:
 a switch assembly, coupled to said card driving pin and operable to provide indication when said card driving pin has reached an extremity of movement along said channel in said bed, where
 said switch assembly is coupled to said motor to reverse the direction of rotation of said motor to return said card driving pin to a start position.

16. A card handling mechanism according to claim 3, wherein said control means comprises:
 a sensor for detecting the insertion of a card into said slot and for providing an output indicative thereof, where
 said output of said sensor is coupled to said actuator means, said actuator means being operable in response to the receipt of said indication from said sensor.

17. A card handling mechanism according to claim 16, wherein said actuator means comprises:
 a bale arm cam mechanism, said cam mechanism comprising:
 a cam;
 a projection on said bale arms having a surface at a right angle to said bale arms; and
 an actuator, where
 said actuator is operable, when released, to position said cam in a first angular position for withdrawing said tips from behind said fascia for allowing the insertion of a card into said slot or the withdrawal of a card from said slot, where
 said actuator is operable to rotate said cam from said first angular position to a second angular position for said cam to engage said bale arms to urge said tips of said bale arms between an inserted card and said slot to prevent the withdrawal of the inserted card from said slot, and where
 said actuator is thereafter operable to rotate said cam from said second angular position to a third angular position for said cam to engage said projection to urge said tips of said bale arms away from said slot behind said fascia to engage the inserted card to urge the inserted card against said stop.

18. A card handling mechanism according to claim 17, wherein said actuator comprises:
 a bale arm linkage coupled to impart rotational motion to said cam; and
 a bale arm solenoid, coupled to said linkage and energisable to pull upon said linkage to impart rotation to said cam.

19. A card handling mechanism according to claim 10, wherein said card driving mechanism comprises:
 a bed for receiving an inserted card whereon the inserted card rests and whereagainst the inserted card is urged by said bale arms;
 a channel in said bed transverse to said direction of insertion of a card; and
 a card driving pin, moveable along said channel and comprising a projecting portion projecting from said channel, where
 said card driving pin is moveable along said channel for said projecting portion to engage an edge of an inserted card which is to be retained to urge the inserted card from said bed into said retaining bin.

20. A card driving mechanism according to claim 19, wherein said card driving mechanism comprises:
 a pin driving wheel having a circumferential channel for engaging and holding said card driving pin; and
 a pin idler wheel comprising a circumferential channel for engaging said card driving pin, where
 said pin idler wheel is co-operatively urged against said pin driving wheel for the retention of said card driving pin therebetween, and where
 said pin driving wheel is rotatable to urge said card driving pin along said channel in said bed.

21. A card handling mechanism according to claim 20, wherein said card driving mechanism comprises:
 a motor for rotating said pin driving wheel, and wherein said control means comprises:
 a switch assembly, coupled to said card driving pin and operable to provide indication when said card driving pin has reached an extremity of movement along said channel in said bed, where
 said switch assembly is coupled to said motor to reverse the direction of rotation of said motor to return said card driving pin to a start position.

22. A card handling mechanism according to claim 16, wherein said card driving mechanism comprises:
 a bed for receiving an inserted card whereon the inserted card rests and whereagainst the inserted card is urged by said bale arms;
 a channel in said bed transverse to said direction of insertion of a card; and
 a card driving pin, moveable along said channel and comprising a projecting portion projecting from said channel, where said card driving pin is moveable along said channel for said projecting portion to engage an edge of an inserted card which is to be retained to urge the inserted card from said bed into said retaining bin.

23. A card driving mechanism according to claim 16, wherein said card driving mechanism comprises:
- a pin driving wheel having a circumferential channel for engaging and holding said card driving pin; and
- a pin idler wheel comprising a circumferential channel for engaging said card driving pin, where
- said pin idler wheel is co-operatively urged against said pin driving wheel for the retention of said card driving pin therebetween, and where
- said pin driving wheel is rotatable to urge said card driving pin along said channel in said bed.

24. A card handling mechanism according to claim 16, wherein said card driving mechanism comprises:
- a motor for rotating said pin driving wheel, and wherein said control means comprises:
- a switch assembly, coupled to said card driving pin and operable to provide indication when said card driving pin has reached an extremity of movement along said channel in said bed, where
- said switch assembly is coupled to said motor to reverse the direction of rotation of said motor to return said card driving pin to a start position.

* * * * *